United States Patent [19]

Wagner

[11] Patent Number: 4,497,100
[45] Date of Patent: * Feb. 5, 1985

[54] APPARATUS FOR WORKING PIPES

[75] Inventor: Rudolf Wagner, Stuttgart, Fed. Rep. of Germany

[73] Assignee: Rems-Werk Christian Föll und Söhne GmbH & Co., Waiblingen, Fed. Rep. of Germany

[ * ] Notice: The portion of the term of this patent subsequent to Oct. 12, 1999 has been disclaimed.

[21] Appl. No.: 393,777

[22] Filed: Jun. 30, 1982

Related U.S. Application Data

[63] Continuation of Ser. No. 125,696, Feb. 28, 1980, Pat. No. 4,353,154.

[30] Foreign Application Priority Data

Aug. 30, 1978 [DE] Fed. Rep. of Germany ....... 2837737

[51] Int. Cl.³ .......................... B27C 9/02; B23P 23/00
[52] U.S. Cl. ...................................... 29/27A; 82/4 A; 144/1 C; 408/20
[58] Field of Search .................. 29/27 C, 27 A, 27 B; 144/1 C, 40, 48; 408/26, 20; 82/4 A; 51/134.5

[56] References Cited

U.S. PATENT DOCUMENTS

| 699,535 | 5/1902 | Kelley | 408/20 X |
| 2,825,269 | 3/1958 | Kelley | 29/27 R |
| 3,073,193 | 1/1963 | Grant | 29/27 B |
| 3,988,814 | 11/1976 | Hoffman | 29/27 A |
| 4,140,032 | 2/1979 | Besenbruch et al. | 82/4 A |

Primary Examiner—William R. Briggs
Attorney, Agent, or Firm—Becker & Becker, Inc.

[57] ABSTRACT

An apparatus for working of pipes or tubes, rod or bars, and the like, in the field of sanitary and heating installations, with electromotor drive. A drive machine is provided as the basic machine, and workpieces or working tools are selectively drivable or powered for carrying out a multiplicity of working procedures individually or in combination with each other, including, for instance, thread-cutting, tube-bending, cutting-off or separating, welding, and pipe cleaning.

4 Claims, 16 Drawing Figures

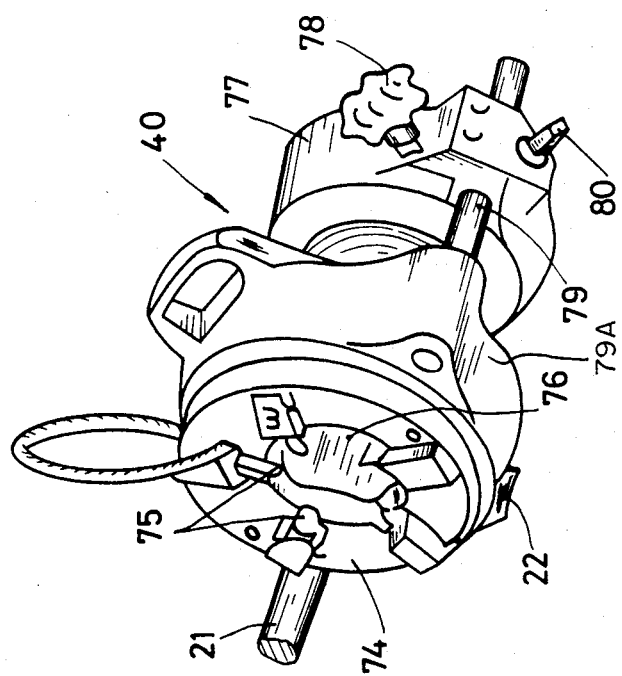
Fig. 9
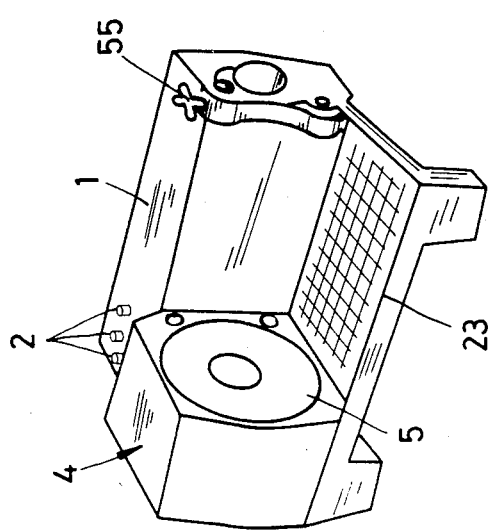

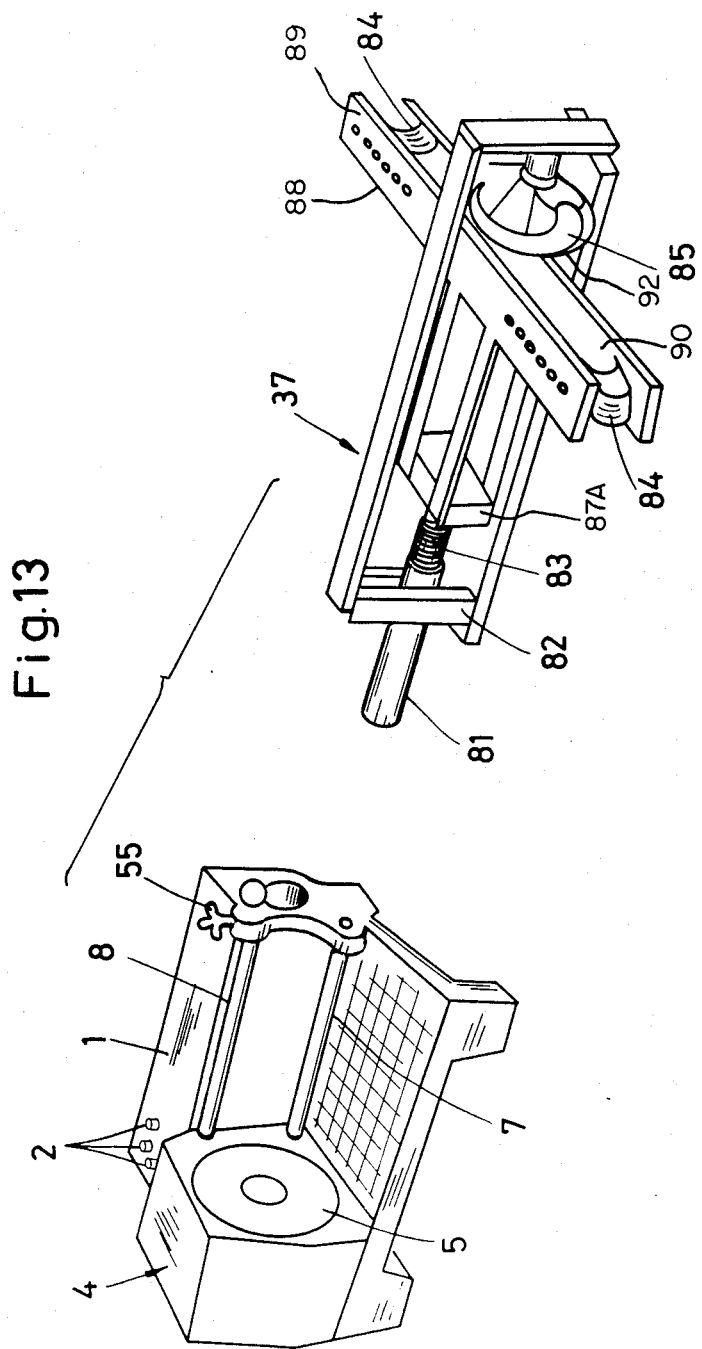

Fig. 15
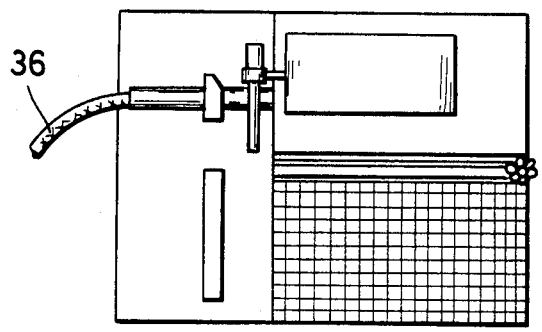
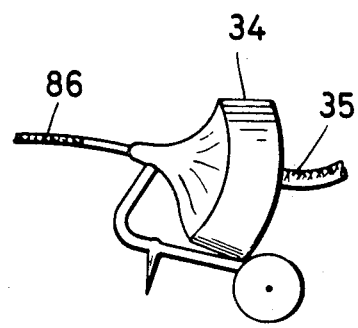
Fig. 14

APPARATUS FOR WORKING PIPES

This is a continuation of co-pending application Ser. No. 125,696-Wagner, filed Feb. 28, 1980, now U.S. Pat. No. 4,353,154-Wagner dated Oct. 12, 1982.

The present invention relates to an apparatus for working of pipes or tubes, rods, and the like, in the field of sanitary and heating installations, with electromotor drive.

Different tools and devices are used in the field of sanitary and heating installations. These tools and devices are manually driven in part, though predominantly the tools and devices are driven by electromotors. Thread-cutting machines are available, for instance, to produce threads on steel pipes for pipe installations; pipe bending machines are available for the production of pipe bends on steel pipes as well as copper pipes, and also cutting or sawing machines are available for the separation of pipes into predetermined lengths. Furthermore, devices exist for continuous rotation or turning of steel pipes as necessary, for example for welding; and also pipe cleaning machines exist with which a spiral is caused to rotate in order to open or make free especially blocked or clogged drainage conduits.

The mentioned devices or machines all represent closed-off systems, which means, each of the mentioned machines and devices has a generally electromotor drive and a mechanical drive, as well as a housing in which both are accommodated or installed. Cost of investment for such equipment is high, and additionally the handling and transporting thereof is complex and costly.

An object of the present invention is to provide an apparatus for working pipes or rods, bars, and the like in the field of sanitary and heating installations, with which substantially all work that arises can be carried out with a minimum of structural complexity.

This object, and other objects and advantages of the present invention, will appear more clearly from the following specification in connection with the accompanying drawings, in which:

FIG. 9 illustrates the machine of FIG. 1 with a thread-cutting head for larger pipe diameter and a separate drive;

FIG. 13 shows the drive machine of FIG. 1 with a pipe-bending device in an exploded perspective view;

FIG. 14 is a view of a commercially conventional device for pipe-cleaning;

FIG. 15 is a plan view of the pipe-cleaning device of FIG. 14 installed on the drive machine of FIG. 1.

Figure 1:
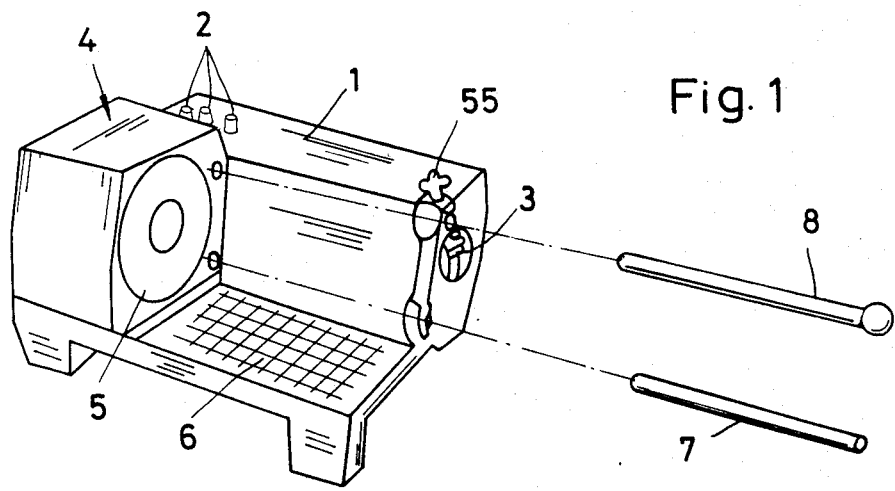
FIG. 1 is a perspective view of the drive machine.

The apparatus of the present invention is characterized primarily by a drive machine, as a basic machine, with selectively drivable workpieces or working tools for carrying out a multiplicity of working procedures alone or in combination with one another, including, for instance, thread cutting, pipe bending, cutting-off and separation, welding, and pipe cleaning.

Advantageously, at least one guide rod or bar is releasably journalled and capable of being fixed in the drive machine for receiving a particular tool carrier, whereby the tool carrier has at least one continuous bore with which it is shiftably journalled upon a guide rod or bar. A guide rod or bar can be interchangeably arranged, and the tool carrier or support can be releasably connected with the drive machine by way of this guide rod or bar. Expediently, the tool carrier at the lower end has a half bearing with which the tool carrier, in the installed state, is seated or located upon a guide rod or bar fixedly arranged in the drive machine.

Also, two guide rods or bars can be arranged in the drive machine in a horizontal plane. In this embodiment, the tool carrier or support has two continuous bores for receiving or taking up the guide rods or bars. The tool carrier or support is easily connected releasably with the drive machine by shifting the tool carrier or support on the guide rods or bars.

A pipe or tube cutter, a thread cutter, and a pipe burring reamer or miller can be pivotally journalled on the tool carrier or support, whereby the tool carrier or support can be provided with supports for receiving the tools. The fixing or fixation of the tools in the supports or mountings is expediently effected with a pin.

In place of the mentioned tools, a vise can also be secured on the tool carrier or support, and for this purpose the vise has supports which are embodied to fit the supports of the tool carrier. The drive machine may have a turning device, preferably a chucking device with clamping jaws, which selectively drive the workpiece or the tool for turning for operation. A thread-cutting head with a pipe-shaped flange can be connected with the turning device of the drive machine, whereby the thread-cutting head is journalled rotatably.

According to a further feature of the present invention, a hand (disc) circular saw machine may be pivotally arranged upon a guide rod or bar and is preferably provided with a bearing eye for receiving the guide rod or bar. This hand circular saw machine can be arranged before the thread-cutting head or before the vise.

With the swivel head of the drive machine there can also be arranged a cut-off head connectible with a pipe-shaped flange. The vise is preferably arranged before the cut-off head. With a variation of the arrangement, the cut-off head can be arranged on the drive machine on that side thereof opposite to the thread-cutting head.

A thread-cutting head for larger pipe diameters is advantageously insertable with a drive tap or pin in the swivel head of the drive machine. The thread-cutting head has an engagement surface upon the underside with which the thread-cutting head is supported on the drive machine.

With a further variation of the present invention, a rotatable bell-shaped flange, preferably a pipe-shaped flange, is connectible with the swivel head of the drive machine for receiving pipes of larger diameter. Expediently, several screws are arranged in the mantle of the bell-shaped flange for arresting or fixing an introduced or inserted large-dimensioned pipe or tube.

Additionally, a turning drive can be connected by way of a drive pipe with the swivel head of the drive machine. This turning drive can have a vertically extending stand, the underside of which is seated upon a guide rod with, for instance, a half bearing, and which has a bore for shiftable journalling upon the other guide rod. The stand can also have two continuous bores for receiving the guide rods or bars. The stand, under such circumstances, is inserted or pushed onto the guide rods or bores rigidly connected with the drive machine. A bracket or cantilever is advantageously arranged on the stand and has two rollers lying spaced sequentially in a plane. One of the two rollers is expediently connected with a drive pipe or tube by way of a belt, and is capable of being driven thereby. The drivable roller can have a handle, for tensioning the drive belt, at the axis thereof, whereby the handle, is advantageously embodied as a yoke or curved handle in such a way that the handle is capable of being actuated with the body. The mantle surfaces of the rollers, if possible, should have a great binding friction, advantageously being made of rubber or having a tread or running surface of rubber or rubber-like material. For pressing into engagement the pipe or tube lying upon the rollers, there can be arranged therewith a pivot roller which is to be arranged at the end of a pivotal bracket or cantilever which is adjustable as to height. The said bracket or cantilever can be guided along a guide pipe or tube extending vertically in the stand, and can be arrestable by way of a clamping means at a particular height or level with respect to the stand.

According to further features of the present invention, a pipe bending device with a correspondingly embodied spindle is drivable with the swivel head of the drive machine, or the swivel head has a spindle to which a spiral of a pipe-cleaning device is capable of being fastened.

By way of the present invention, it is possible to use only a single drive machine as the basic machine with simple handling accompanied by considerably reduced complexity for carrying out a multiplicity of working procedures on pipes, rods, and the like for the field of sanitary and heating installations. Selectively, without special effort, there can occur the conversion of a thread-cutting machine with a pipe-turning device, with which the clamped pipe rotates about an axis, into an embodiment with which the pipe is rigidly clamped and the cutting head rotates.

Referring now to the drawings in detail, the drive machine is installed or used as a basic machine for all working procedures. The drive machine comprises a housing 1 with operating elements 2, an electromotor 3, a drive 4 for the swivel head or turning mechanism 5, as well as a chip pan or tray 6 integrally connected with the housing 1. The swivel head 5 can advantageously be a rotatably journalled grip or specimen holder with approximately radially advanceable clamping jaws (not illustrated) which preferably can be moved in a motor-driven manner into and out of the clamping position. A guide rod 7 is rigidly connected with the drive machine. A further guide rod 8 is arranged interchangeably on the drive machine. According to FIGS. 2 and 3, a tool-carrier or support 9 is capable of being fixed by way of a clamping device 55 upon both guide rods 7, 8, and the tool-carrier or support is capable of being interchangeably assembled therewith. Consequently, the tool carrier or support can be installed or disassembled simply as a unit with respect to the drive machine.

The tool-carrier or support 9 has a continuous bore 51 through which the guide rod 8 is pushed or shifted, whereby the bore 51 proceeds in a part 53 of the tool-carrier or support 9. At the lower end, the tool-carrier 9 has a half bearing 50 with which the tool-carrier 9 is capable of being placed up on the guide rod 7. After insertion and fixation of the guide rod 8, the tool-carrier is connected easily releasably with respect to the drive machine, though it remains shiftable upon the guide rods 7 and 8. A handle 54 is provided to facilitate grasping of the tool-carrier or support 9.

In addition, the tool-carrier or support 9 has bearings or supports 13, 14, 15 into which suitable tools are insertable. A pipe cutter 10, a thread cutter 11, and a burring reamer or miller 12 are provided for example in FIGS. 2 and 3. The tools have bearing eyes 56, 57, 58 through which a pin 52 is inserted after installation or insertion of the tools in the bearings or supports 13, 14, 15, so that the tools are rigidly connected with the tool-carrier or support 9, yet remain pivotable about the axis 59 of the pin 52. With the embodiment according to FIGS. 2 and 3, the thread-cutting machine has a rotatable cutting head. The tool-carrier 9, with the tools 10, 11, 12, after withdrawal of the guide rod 8, is placed as a unit with the half bearing 50 upon the lower guide rod 7. Subsequently, the guide rod 8 is pushed or inserted into a corresponding bearing recess in the housing 1 by way of the bore 51 of the tool-carrier 9, and the guide rod 8 is fixed or clamped to the housing with the clamping device 55.

For separation of a workpiece, the pipe cutter 10 is pivoted about the axis 59 until a cutting element 60A comes into engagement against the workpiece. The cutting element 60A is pressed against the workpiece with a handle 61, whereby the workpiece is turned or rotated by the drive machine and in this manner is separated.

The thread cutter 11 serves for cutting outer threads upon a pipe or tube or rod. The workpiece under such circumstances is guided through a bore 62 in the thread cutter, a non-illustrated cutting knife means of which projects radially into the bore 62. During the cutting procedure, the workpiece is clamped in the grip or specimen holder of the clamping device 5 and is rotatably taken along thereby. The thread cutting head 11 is moved axially of the pipe or tube by means of the tool-carrier 9 during the thread cutting. The feed can be enhanced by a hand upon the handle 54 by way of a slight supporting force.

The burring reamer or miller 12 has a sharp-edged conical milling tool 64 which is engaged against a pipe end by axial shifting, and with which the pipe end is engaged internally.

Figure 3:
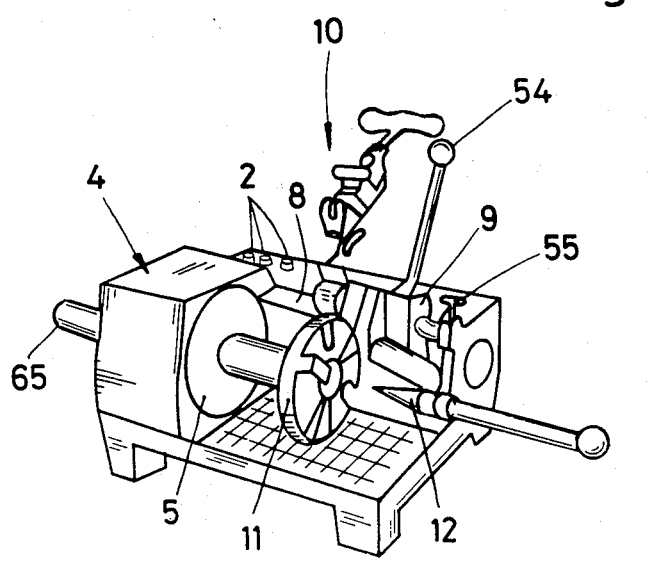
FIG. 3 is a perspective illustration of the pipe-turning machine according to FIG. 2 in a state capable of functioning.
Figure 2:
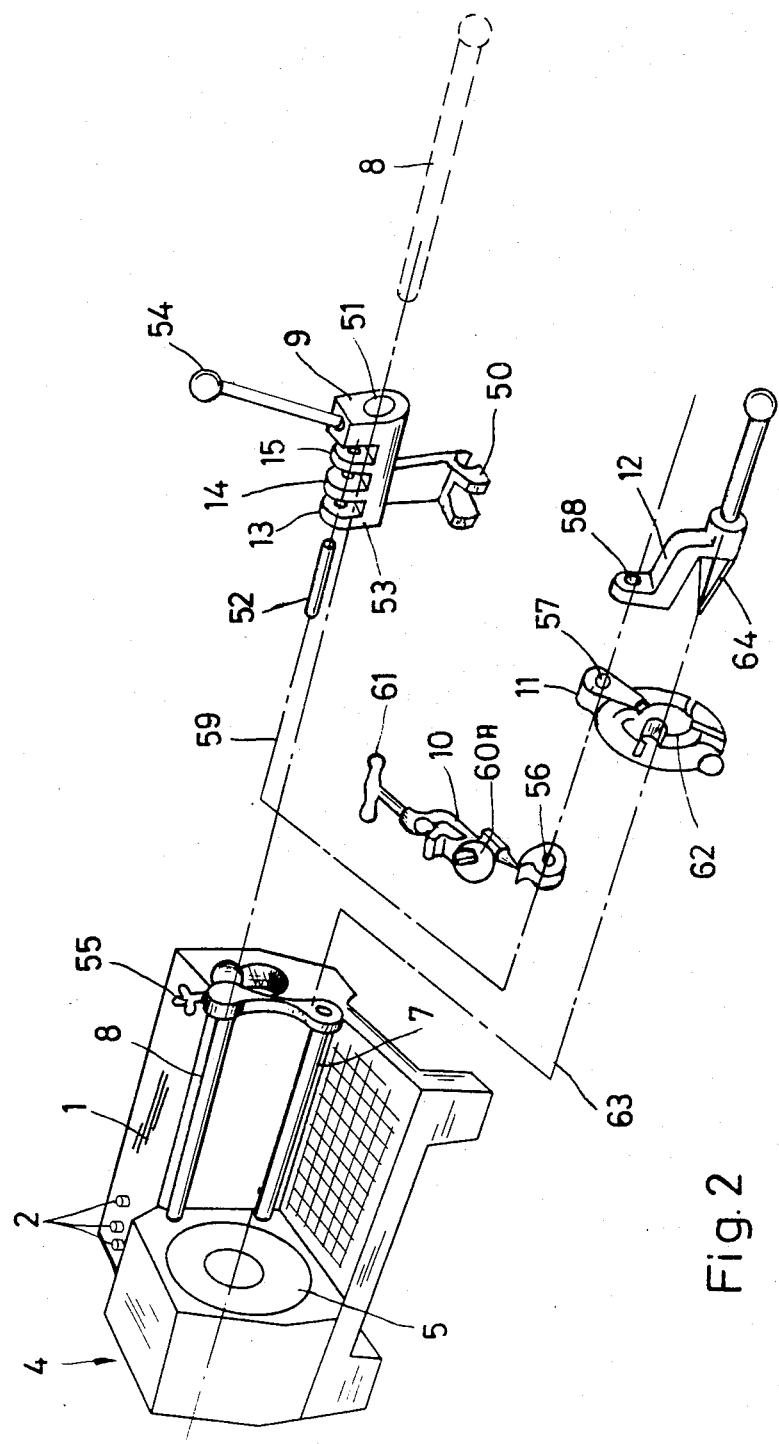
FIG. 2 illustrates the drive machine of FIG. 1 with a pipe-turning machine in an exploded perspective view.

FIG. 3 illustrates the apparatus or device according to FIG. 2 in the assembled state. A pip or tube 65 is clamped in the swivel head 5, which is embodied with the grip or specimen holder, and the pipe 65 projects on both sides from the drive machine.

Figure 4:
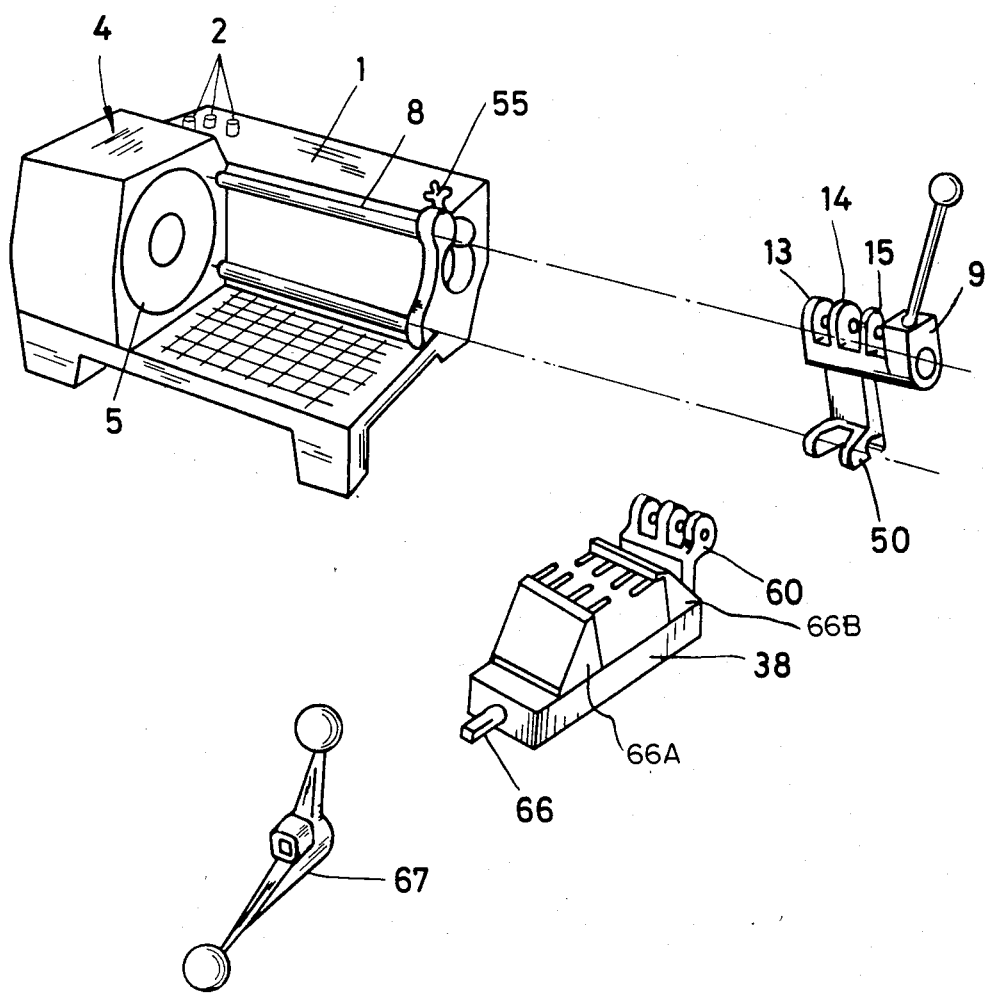
FIG. 4 illustrates the drive machine according to FIG. 1 with a tool-carrier and a vise in an exploded illustration.

With the embodiment according to FIG. 4, a vise 38 is provided in place of the tools 10, 11 and 12; the vise 38 can be installed with a fork-type journalling with bearing eyes 60 in the bearings or supports 13, 14 and 15 of the tool-carrier or support. A pin with which the vise 38 is pivotally connected with respect to the tool-carrier 9 is pushed through openings in the supports 13, 14 and 15 of the tool-carrier of support. A pin with which the vise 38 is pivotally connected with respect to the tool-carrier 9 is pushed through openings in the supports 13, 14 and 15 and in the bearing eyes 60 corresponding to the embodiment of FIG. 2. For adjustment of at least one vise jaw 66A, 66B, a stud shaft 66 projecting from the vise is rotated and is drivably connected with at least one vise jaw by a non-illustrated drive; this vise jaw is shiftable in the axial direction of the stub shaft. A crank 67 can be installed upon the stub shaft to facilitate the adjustment of the vise jaw.

The vise can also be so embodied that it can be assembled directly upon the guide rods 7,8 (FIG. 4a), i.e. without any tool-carrier 9. For this purpose, the vise 38A at one end has a through passage or bore 68 for the guide rod 8, and at the oppositely located end face has an outwardly open depression 87 with which the vise can be placed upon the guide rod 7. The vise 38A is secured with a clamping device 55 (FIG. 2) upon the guide rods 7, 8. The vise jaws are movable approximately at right angles or vertically with respect to the guide rods 7, 8 and with respect to the chip tray or pan 6, while with the vise 38 according to FIG. 4, the direction of movement is aproximately at right angles or vertically with respect to the guide rods and approximately parallel to the chip tray or pan. The vise 38A can now be connected easily interchangeably with the drive machine like the tool-carrier 9 according to FIG. 2.

Figure 4A:
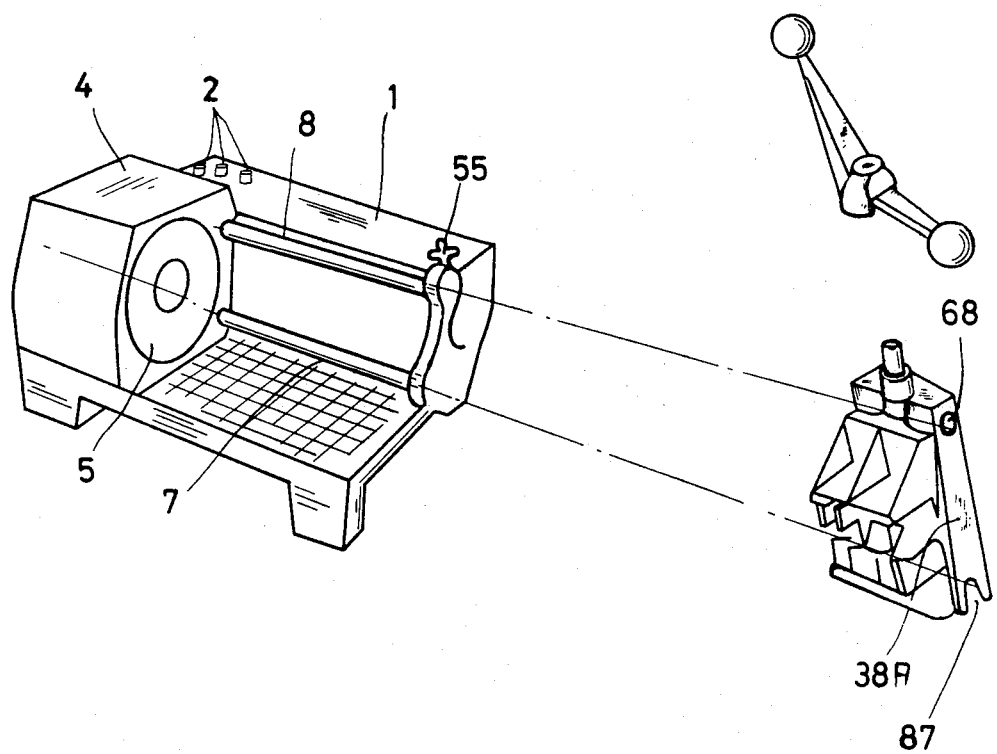
FIG. 4a shows the arrangement of FIG. 4, however, with a vise journalled on the tool-carrier.
Figure 5:
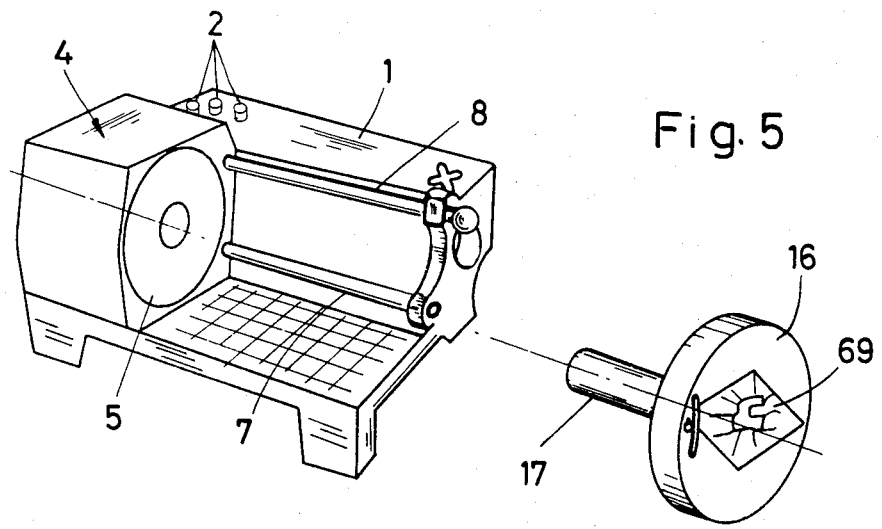
FIG. 5 illustrates the drive machine of FIG. 1 with a thread-cutting head in an exploded perspective view.
Figure 6:
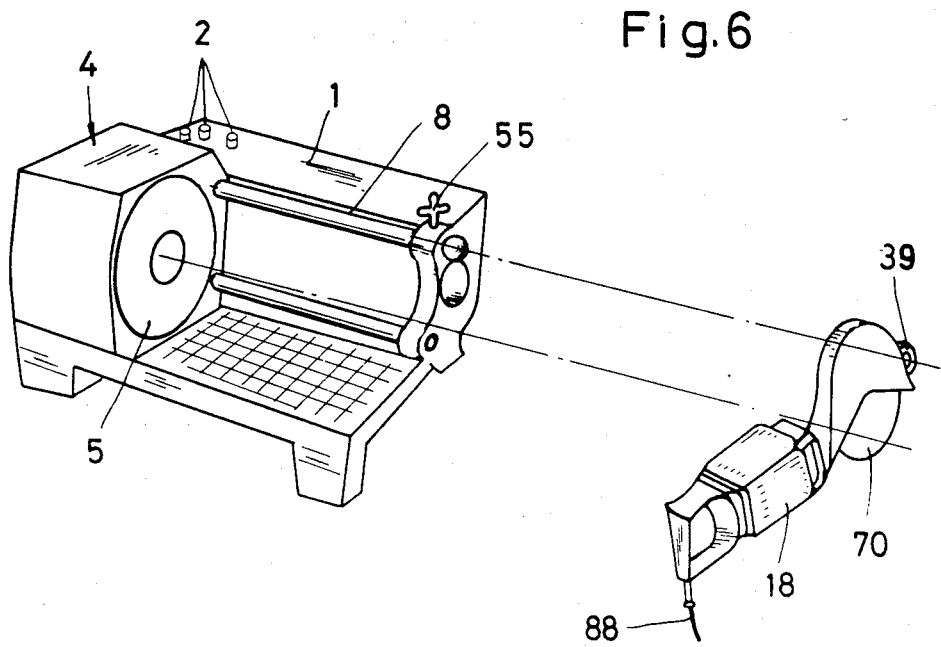
FIG. 6 shows the drive machine according to FIG. 1 with a manual circular saw in an exploded perspective view.

In connection with the arrangement of a vise according to FIGS. 4 and 4a, a plurality of tools for working of a workpiece held in the vise can be installed in the swivel head 5. For instance, a thread-cutting head 16 according to FIG. 5 with a pipe-shaped flange 17 can be clamped in the swivel head 5, so that the rotating grip or specimen holder turns the cutting head 16 by means of the flange 17. The thread-cutting head has thread-cutting jaws 69 with which an external thread can be cut. In this way, a thread-cutting machine with a stationary workpiece and a rotatable cutting head is formed.

An electrically driven hand circular (disc) saw machine 18 (FIG. 16) can be pushed or inserted upon the guide rod 8 alone or additionally, and the machine 18 is fastened with the clamping device 55. The hand circular saw machine has a bearing eye 39 for insertion or shifting upon the guide rod 8 upon which the hand circular saw machine 18 is then pivotally journalled. The workpiece provided with a thread can then be easily separated with the hand circular saw machine 18. The hand circular saw machine 18 is provided with a saw blade 70. The motor is connected to a voltage source by means of an electrical supply 88.

Figure 7:
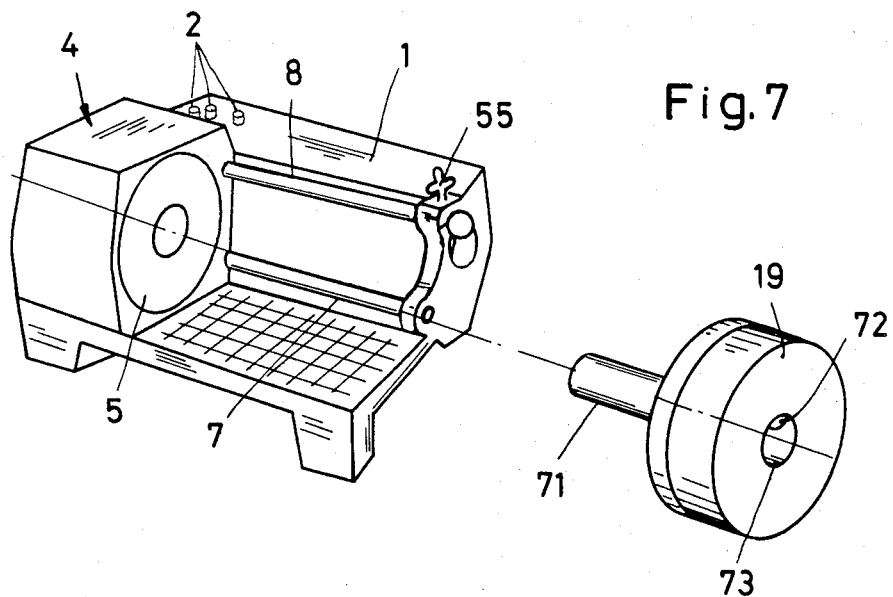
FIG. 7 shows the drive machine according to FIG. 1 with a cutting-off head in an exploded perspective view.

The workpiece can also be separated with a cutting head 19 according to FIG. 7, whereby the workpiece is clamped in the vise 38 according to FIG. 4. The cutting head 19 has a pipe-shaped flange 71 which is clamped in the swivel head and rotatably driven by means of the grip or specimen holder. The cutting head 19 is also rotatably driven thereby, while the workpiece clamped in the vise 38 stands still. A cutting arrangement 72 of the cutting head 19 is pressed against the workpiece by a non-illustrated clamping device, and the workpiece projects through an opening 73 in the cutting head 19. The desired pipe end is separated or cut off by rotating the cutting head 19.

Figure 8:
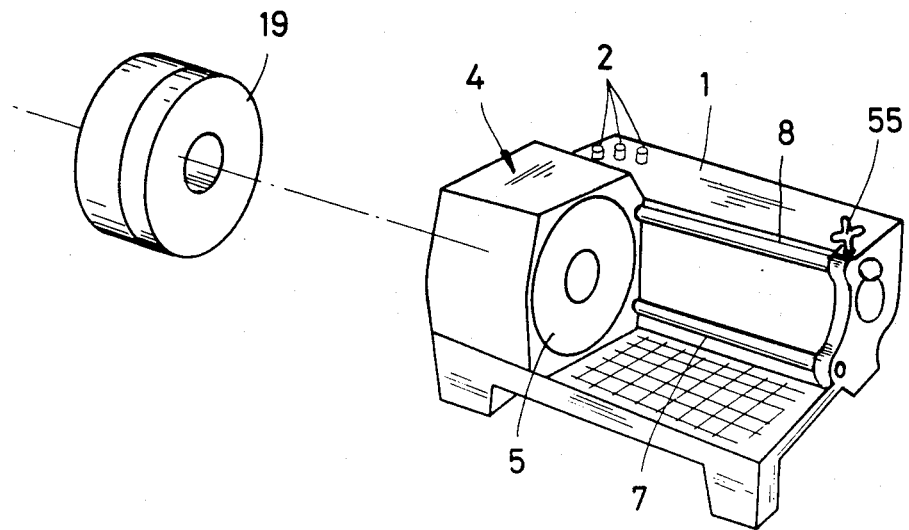
FIG. 8 shows the machine of FIG. 1 though with the provision of a built-in shearing or cutting-off head upon the opposite side thereof.

The thread-cutting head 16 and the cutting head 19 can also be assembled in common on the drive machine. For this situation, the cutting head 19 is arranged on the swivel head on that side of the drive machine facing away from the thread-cutting head 16 or from the saw chip tray or pan (FIG. 8). Consequently, the disadvantageous interchanging of both tools 16 and 19 with respect to each other is eliminated.

For working on pipes or rods with greater diameters, a thread-cutting head 40 (FIG. 9) can also be clamped in position with a drive stud 21 in the rotatable grip or specimen holder of the swivel head 5, so that a cutting head 74 with thread-cutting jaws 75 can be rotatably driven by the grip or specimen holder, the drive stud, and a non-illustrated drive. The thread-cutting jaws are journalled to be fed and adjusted approximately radially. If the thread-cutting head 40 is to be clamped in the swivel head 5, then the guide rods 7, 8 can be removed previously. The workpiece to be worked or machined projects through an opening 76 of the thread-cutting head 40 and is fixedly clamped in a work-locating fixture, chuck or jig 77, which is journalled axially shiftable and arrestable upon two oppositely located guide rods 79, only one of which is illustrated in FIG. 9. Both guide rods 79 are secured in side or lateral bearing eyes 79A of the thread-cutting head 40. The chuck or jig 77 can be arrested or secured upon the guide rods 79 by a clamping device 78A actuated by means of a handle 78. A stub shaft 80 is provided for delivery or in-feeding of the non-illustrated clamping jaws of the chuck or jig 77, and the stub shaft 80 can be rotated with an insertable grip or handle, whereby the clamping jaws are fed or advanced by way of a drive in the desired manner. The workpiece stands still with such an arangement of the apparatus, while the cutting head 74, which is driven by the grip or specimen holder of the swivel head 5, rotates during thread-cutting.

Figure 10:
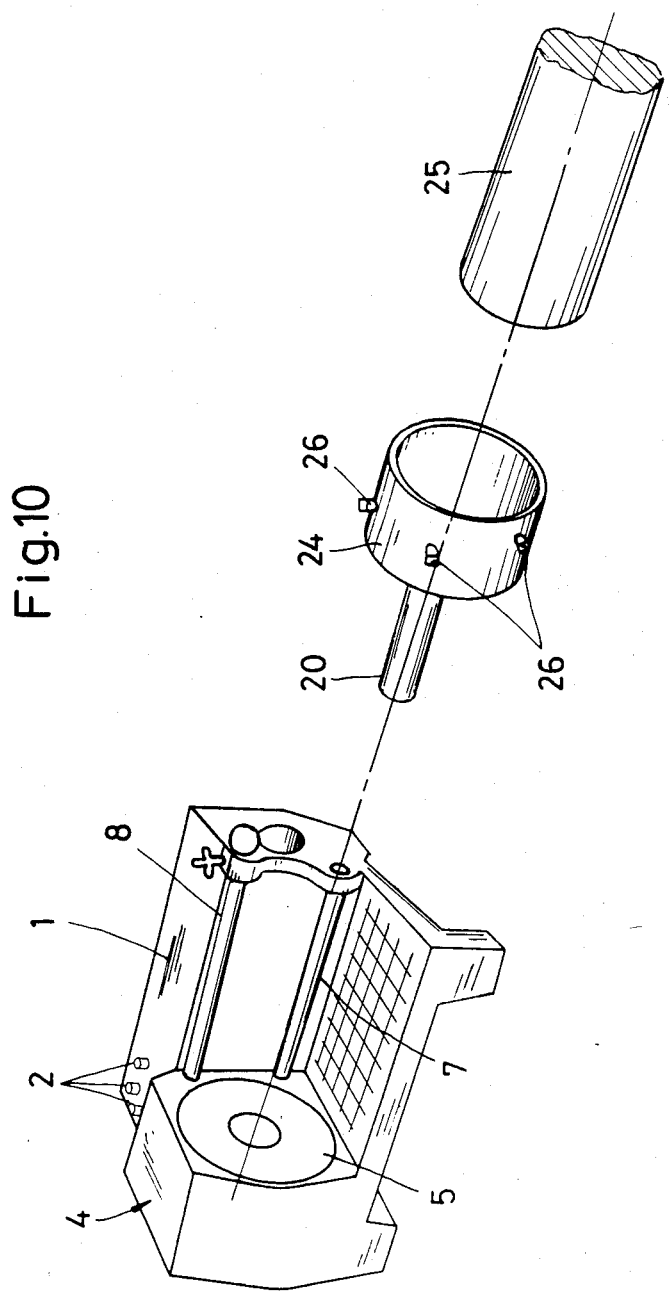
FIG. 10 shows the drive machine according to FIG. 1 with a rotatable bell-shaped flange in an exploded perspective view.

If the apparatus is to be used for cutting off tubes or pipes or rods 25 of larger diameter (FIG. 10), a bell-shaped flange 24 is clamped in the swivel head of the drive machine by means of a preferably tube-shaped flange having a smaller diameter, so that the flange 20 and the workpiece 25 clamped therein are rotatably driven by the grip or specimen holder of the swivel head 5. Clamping screws 26 are arranged distributed over the periphery in the mantle of the bell-shaped flange 24; with these screws 26, the workpiece can be fastened in the flange. The secured or clamped workpiece can then be worked with the previously described tools.

Figure 11:
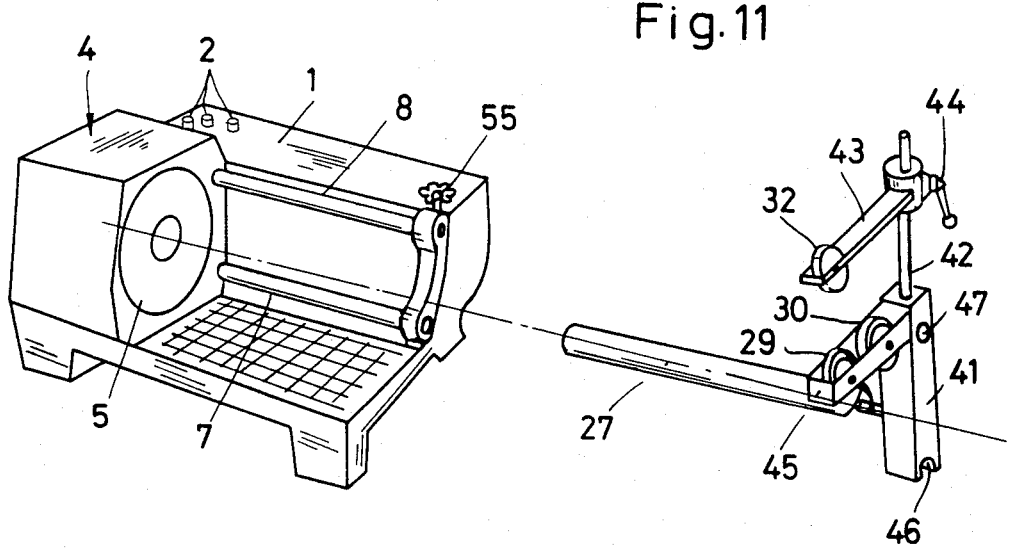
FIG. 11 shows the drive machine of FIG. 1 with a swivel head in an exploded perspective view.
Figure 12:
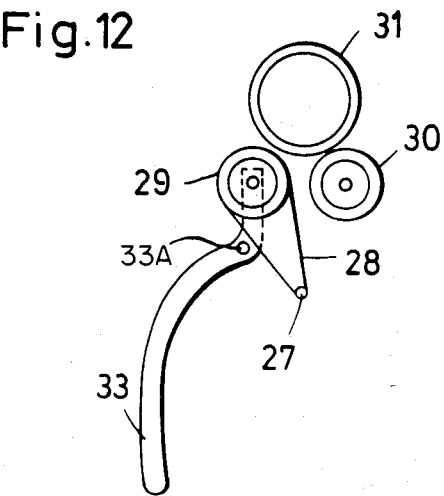
FIG. 12 is a side view of a part of the swivel head.

For the connection or separation of pipes or tubes by welding or separation cutting, it is necessary to rotate the pipe or tube uniformly. The rotating drive necessary for this purpose can be connected according to FIG. 11 likewise as an auxiliary device on the drive machine. The connection between the rotatable grip or specimen holder of the swivel head 5, and the rotating drive, occurs by way of a drive tube 27. The rotating drive has an upwardly directed stand 41, in the lower end face of which there is provided a depression or recess 46 having a partially circular cross section and into which the guide rod 7 engages. In the upper region of the stand 41 there is provided a passage or bore 47 for the guide rod 8. The stand is shiftably journalled upon both guide rods 7, 8, and can be fixed or secured upon the guide rods with the clamping device 55. On the stand 41 there is a transversely movable carrier or support arm 45 with two rollers 29, 30 lying in a plane and spaced in sequence one after the other. These rollers are made of rubber, or have a rubber covering thereon. The roller 29 is connected with the drive tube 27 by a drive belt 28 (FIG. 12). The driven roller 29 is fixed and not shiftable with respect to the carrier or support arm 45. Since for the noted work, especially for welding, the speed also must have different magnitude corresponding to the different diameters of the pipe or tube to be welded in order to attain a speed suitable for the welding, the axis of the roller 29 is seated or located at the free end of one arm of the two-arm lever 33, which is pivotable about an axis 33A. By swinging or pivoting the lever 33, and accordingly the roller 29, the tension of the belt 28 can be adjusted. In addition to the speed reduction of the drive tube 27 with respect to the roller 29, there can also be obtained a speed regulation or control by changing the slip of the drive belt 28.

The lever 33 is embodied in a bracket or U-shape, so that it can also be actuated with the body during the welding, whereby the operating individual, especially during fusion or autogenous or oxyacetylene welding, needs both hands. The workpiece 31 to be rotated or turned (FIG. 12) lies upon the rollers 29 and 30. The pipe is pressed against the rollers 29 and 30 by a counter-pressure roller 32 to assure movement or taking along of the pipe or tube 31 by the driven ro roller 29 only by power or force connection (FIG. 11). The counter-pressure roller 32 is journalled freely rotatable at the end of a carrier arm 43, which is pivotal and adjustable as to height; this carrier arm 43 is seated to be shiftable or clampable upon a guide pipe or tube 42 extending vertically in the stand 41. The carrier arm 43 is secured or clamped upon the guide pipe 42 at a suitable height which is determined by the diameter of the pipe 31 to be turned or rotated; the clamping upon the guide pipe 42 is accomplished by a clamping device 44 actuated by means of a handle 44A.

According to FIG. 13, a pipe bending device 37 can be driven with the rotatable grip or specimen holder of the swivel head 5. The pipe bending device has a frame 82 in which a drive sleeve 81 is rotatably journalled but is axially non-shiftable. The end of the drive sleeve 81 projecting over the frame 82 is clamped in the grip or specimen holder of the swivel head 5, and the bottom of the frame 82 engages upon the saw chip tray or pan of the drive machine. A threaded spindle 83 is screwed into the internal threads of the drive sleeve 81; the threaded spindle 83 is rigidly secured against rotation on one end piece 87A of a T-shaped holder 88 which is shiftable in the frame 83. The holder 88 comprises two narrow plates 89, 90 which are spaced from one another and are connected with each other in the region of the ends by a support element 84, 84A respectively on which the pipe or tube to be bent is supported during the bending prodedure. A counter-pressure piece or member 85 is secured on that end of the frame 82 located across from the drive sleeve 81. The surface 92 of the member 85 facing the holder 88 is curved in conformity with the desired maximum diameter.

To bend the pipe or tube, there is adjusted a corresponding speed and direction of rotation of the drive machine. The drive sleeve 81 is rotatably driven by the grip or specimen holder of the swivel head 5, whereby the threaded spindle 83 is pushed out of the drive sleeve 81. Consequently, the holder 88, in which the pipe or tube is placed, is shifted in the direction toward the counter piece or member 85, which projects into the T-holder; under these circumstances, the pipe or tube, which is supported only at the support elements 84, 84A, is bent at the engagement surface 92 of the counterpressure piece or member 85 as far as to the desired bending radius. Subsequently, by changing the direction of rotation of the drive machine, the threaded spindle 83 is again retracted or withdrawn into the drive sleeve 81, whereby the holder 88 is removed from the counterpressure piece or member 85, and the bent tube or pipe can be removed. The end faces of the support elements facing the pipe or tube can be embodied advantageously in a slightly concave manner, so that they substantially conform to the shape of the pipe or tube.

FIG. 14 shows a commercially conventional pipe-cleaning device, which in essence includes a spiral 86 embodied in an especially yieldable and bendable manner and capable of being rotated to be introduced into the pipe or tube to be cleaned; this spiral 86 is secured to a drum 34 in the rotating axis thereof. The drum is manually rotated by means of a crank 35. The pipe-cleaning device can be driven, however, in a considerably more simple manner with a drive machine. For this purpose, in place of the crank 35 and the drum 34, there is provided a spindle 36 which is connected to and rotatably moved with an output of the drive machine (FIG. 15) or with a turning or rotating device. The spiral 86 is inserted directly into the spindle or fastened thereon. The spindle can also be a component of the swivel head 5.

The swivel head 5 need not be provided with clamping jaws for receiving tools. In order to save the infeed device of the clamping jaws, the tools 16, 19, 24, for example, can be embodied without pipe or tubular shaped flange means 17, 20, 71, and can be fastened directly upon the swivel head 5. Accordingly, the tools can provide radially projecting flanges with which they are easily releasable, so that, for instance by means of screw connections, they are capable of being fastened on the swivel head or turning mechanism on a side thereof toward or away from the chip tray or pan 6. Also other embodiments of connections between the swivel head 5 and a tool are conceivable. Accordingly, the tool can provide a radially projecting stud which comes into a location in a depression or recess of the swivel head or mechanism, so that the swivel head or turning mechanism takes along the tool in the direction of rotation by means of a stud positively engaging in the peripheral direction. By means of such a positive connection, it is noted that also the drive stud 21 (FIG. 9), the drive pipe or tube 27 (FIG. 11), the drive sleeve 81 (FIG. 13), or the spindle 36 (FIG. 15) can be connected with the swivel head or turning mechanism. With such connections, it must be made certain that the tool cannot shift axially with respect to the swivel head 5. For this purpose, a non-illustrated snap closure can be provided in the swivel head or turning mechanism, or a part of the tool which does not rotate therewith can be fixed on the drive machine so that the tool is secured axially.

In another non-illustrated embodiment of the drive machine the guide rods are rigidly connected with the drive machine. The guide rods are located preferably on both sides of the swivel head or turning mechanism parallel to the turning axis over the chip tray or pan 6. The tool 38, the tool carrier 9, and the stand 41 of the rotating drive, then provide two through-passages or bores with which the same can be inserted or installed upon the guide rod means. The same are capable of being fixed by means of a clamping device and easily exchangeable upon at least one guide rod.

In summary, the present invention provides an apparatus for working of pipes or tubes, rods or bars, and the like, in the field of sanitary and heating installations, with electromotor drive. A drive machine is provided as the basic machine, and workpieces or working tools are selectively drivable or powered thereby for carrying out a multiplicity of working procedures individually or in combination with each other, including, for instance, thread-cutting, tube-bending, cutting-off or separating, welding, and pipe cleaning. At least one guide rod or bar 8 is journalled releasably and capable of being fixed in the drive machine for receiving at least one of the particular tools mounted with a tool carrier or support 9. The tool carrier or support preferably includes at least one continuous bore or passage 51 with which it is shiftably journalled upon one of the guide rod means 8, which preferably can be arranged interchangeably. The tool carrier 9 is longitudinally movable upon the guide rod 8 and is releasably connected by may of the guide rod 8 with the drive machine. The tool carrier 9 is provided with bearings 13, 14, 15, especially for receiving or taking up tools, and in which the tools preferably are fixed by means of a pin 52. The tool carrier may have a tube cutting-off means 10, a thread cutter 11, and a burring reamer or miller 12 pivotally journalled thereon. A vise 38 may be fastened on the tool carrier 9, and this vise 38 preferably has bearing eyes 60 which are embodied to fit with respect to the bearings 13, 14, 15 of the tool carrier 9. The drive machine may have a swivel head 5, preferably a work-locating fixture, chuck, jig, and the like with clamping jaws, which drives the workpiece or tool (16, 19, 24, 27, 34, 37, 40) for rotational working and operation. A thread-cutting head 16, preferably rotatably journalled and provided with a pipe or tube-shaped flange 17, may be connectible with the swivel head 5; a manual circular saw machine 18 may be pivotally arranged upon the guide rod 8, and may be provided with a bearing eye 39 for receiving the guide rod 8 and is preferably arranged before the thread-cutting head 16. A cutting head 19, especially with a pipe or tube-shaped flange, may be connectible with the swivel head 5 of the drive machine, and the vise 38 may be arranged preferably ahead of the cutting head 19, which preferably is arranged on that side of the drive machine remote from or opposite to the thread-cutting head 16. A thread-cutting head 40 for larger pipe or tube diameters may be arranged insertably with a drive stud 21 in the swivel head or turning mechanism 5 of the drive machine; the thread-cutting head 40 preferably has an engagement surface 22 upon the underside thereof with which it is supported on the drive machine. A rotatable bell-shaped flange 24 may be connectible preferably my means of a tube-shaped flange 20 with the swivel head 5 of the drive machine for receiving pipes or tubes 25 of larger diameter. In the mantle of the bell-shaped flange 24, preferably several screws 26 may be arranged for arresting the inserted larger dimensioned pipe or tube 25.

A rotating drive may be connected by means of a drive tube 27 with the swivel head 5 of the drive machine; the arrangement includes a stand 41 having at least one bore 51 for shiftable journalling upon the guide rod 8. A bracket or cantilever 45 with two rollers 29, 30 lying in a plane and spaced in sequence one after another may be arranged on the stand. The roller 29 preferably is connected with the drive tube 27 and is drivable in this manner by way of a belt 28, the tension of which is adjustable especially by means of a handle 33. The handle 33 may be arranged on the axis of the roller 29 driving the workpiece, and preferably is embodied as a curved handle in such a way that it is capable of being actuated with the body. A counterpressure roller 32 may be provided for pressing against a pipe or tube 31 lying upon the rollers 29, 39, and is preferably arranged at the end of a bracket or cantilever 43 which is adjustable as to height, and in particular is pivotally arranged and preferably guided by a guide tube or pipe 42 extending vertically in the stand 41; the bracket or cantilever 43 preferably is capable of being arrested by a clamping means 44 at a particular height on the stand 41.

A tube-bending device with a correspondingly embodied flange may be insertably arranged in the swivel head 5 of the drive machine, whereby at least one guide rod 7, 8 is provided for supporting the torque or turning moment. A pipe-cleaning device 34 may be connected by a bendable shaft 36 with the swivel head 5. A spindle may be insertable in the swivel head 5 and may be drivingly connected with a spiral 86 of a pipe-cleaning device 34. The spindle may be a part of the swivel head 5, and the spiral 86 may be fixed against rotation on the spindle.

The present invention is, of course, in no way restricted to the specific disclosure of the specification and drawings, but also encompasses any modifications within the scope of the appended claims.

What I claim is:

1. An apparatus with electromotor drive, comprising in combination a drive machine as a basic machine having a housing including at least one bearing opening therein as well as a clamping device installed in the housing and a motor including a turning-mechanism that drives workpieces and working devices rigidly connected therewith selectively for carrying out machining operations including cutting as well as chip removal, including means for performing the machining operations, as least one guide rod detachably and fixedly journalled in the bearing opening of the housing for said drive machine for receiving a tool-carrier provided with at least one continuous bore with which said tool-carrier is mounted to be displaceably journalled on at least one guide rod, said at least one guide rod being interchangeable relative thereto, and a chip tray provided in a region below said at least one guide rod, said chip tray structurally being integrally connected in one piece and unitary with said housing, said tool-carrier also being capable of being fixed upon said guide rod when installed as well as disassembled simply as a unit easily releasable with respect to the drive machine through remaining shiftable upon said guide rod, a swivel head and clamping device for driving workpieces and devices for rotational machining operations, means providing a thread-cutting head and means to make it connectible with said swivel head, manual circular saw machine on a guide rod, said thread-cutting head being rotatably journalled and being provided with a tube-shaped flange gripped by said connectible means including clamping jaws, said saw machine being pivotally arranged on said at least one guide rod, being provided with a bearing eye for receiving said guide rod, and being arranged before said thread-cutting head, a cutting-off head and means to make it connectible with said swivel head of said drive machine, said cutting-off head being provided with means including a tube-shaped flange, and a vise secured on a guide rod arranged before said cutting-off head, the latter being arranged on that side of said drive machine opposite said thread-cutting head.

2. An apparatus according to claim 1, which includes a rotatable bell-shaped flange and means to make it connectible with said swivel head of said drive machine for receiving tubes of larger diameter.

3. An apparatus according to claim 2, in which said bell-shaped flange includes a tube-shaped flange for effecting said connection with said swivel head, and in which a plurality of screws are arranged in the mantle of said bell-shaped flange for arresting a larger dimensioned tube inserted therein.

4. An apparatus according to claim 4, which includes a rotatable drive and means making it connectible to said swivel head of said drive machine by a drive tube which includes a stand having at least one bore for displaceably journalling said stand on said at least one guide rod.

* * * * *